United States Patent [19]

Braman

[11] Patent Number: 5,064,987
[45] Date of Patent: Nov. 12, 1991

[54] RESISTANCE WELDING APPARATUS WITH POWER CONTROL FOR REDUCED ARCING

[75] Inventor: David P. Braman, North Kingstown, R.I.

[73] Assignee: Crafford Precision Products Co., East Providence, R.I.

[21] Appl. No.: 573,482

[22] Filed: Aug. 24, 1990

[51] Int. Cl.$^5$ .............................................. B23K 11/24
[52] U.S. Cl. .................... 219/110; 219/86.21
[58] Field of Search ....................... 219/110, 109, 86.21

[56] References Cited

U.S. PATENT DOCUMENTS

| | | | |
|---|---|---|---|
| 2,077,600 | 4/1937 | Watson | 219/86.21 |
| 2,656,446 | 10/1953 | Albarranc | 219/86.21 |
| 2,675,454 | 4/1954 | Warner | 219/86.21 |
| 3,462,577 | 8/1969 | Helms et al. | 219/110 |
| 3,538,293 | 11/1970 | Procacino | 219/110 |
| 4,876,430 | 10/1989 | Herschitz et al. | 219/110 |

*Primary Examiner*—Clifford C. Shaw
*Attorney, Agent, or Firm*—Salter & Michaelson

[57] ABSTRACT

A resistance welding apparatus includes a power supply, a pair of welding electrodes and a welding circuit which is operative for controlling the operation of the electrodes to effect a welding operation. The welding circuit is operative for controlling the operation of the electrodes so that a welding operation can only be carried out on a workpiece assembly in the event that the resistance in the circuit path between the electrodes is within a range which is not likely to cause arcing between one or both of the electrodes and the workpiece assembly. The welding circuit further includes a current comparator for controlling the level of the current passed through the electrode during a welding operation.

12 Claims, 4 Drawing Sheets

RESISTANCE WELDING APPARATUS WITH POWER CONTROL FOR REDUCED ARCING

BACKGROUND AND SUMMARY OF THE INVENTION

The instant invention relates to welding apparatus and more particularly to a resistance welding apparatus which is adapted to minimize arcing during a welding operation.

The concept of resistance welding is extremely well known and has been utilized in a wide variety of applications. In this regard, resistance welding is based on the principal of passing a relatively high electrical current through a metal component in order to heat the metal in the current path therethrough to a temperature above the melting point of the metal in the component. More specifically, a resistance welding operation is carried out by contacting a metal workpiece assembly comprising a pair of workpieces, or a pair of workpieces and a welding material, with a pair of electrodes in order to pass a relatively high electrical current through the workpiece assembly. When an electrical current is passed through a workpiece assembly in this manner the resistances of the electrodes and of the metal components in the workpiece assembly cause the metal in the current path through at least one of the metal components to be heated to a temperature above the melting point thereof in order to weld the melted component to one or more adjacent components in the workpiece assembly.

It has been found that the main variables in a resistance welding operation of the above described type are current, welding time, and electrode force. In this regard, it has been found that by altering the amount of current delivered to a workpiece assembly, or the welding time during which current is delivered thereto, it is possible to vary the amount of power delivered to the workpiece assembly in order to vary the amount of heat generated at the welding site. However, it has also been found that if the electrodes utilized in a welding operation are not applied to a workpiece assembly with sufficient levels of contact force, relatively high contact resistances can develop between the electrodes and the workpiece assembly causing arcing to occur in of the areas where one or both of the electrodes contact the workpiece assembly. It has been further found that arcing can cause blow holes and/or distortion in the metal components of a workpiece assembly and that as a result it can be extremely important to control the contact forces applied to a workpiece assembly by a pair of electrodes during a welding operation. Although it can be a relatively simple matter to maintain the proper levels of contact force when performing a welding operation utilizing an automated welding apparatus which is operative for mechanically aligning and contacting the electrodes thereof with a workpiece assembly it can be much more difficult to manually align and apply the electrodes of a manually operable welding apparatus to a workpiece assembly with sufficient levels of contact force to avoid arcing. As a result, it has been found that arcing can often occur when welding a operation is carried out utilizing conventional welding apparatus comprising one or more hand held electrodes. Further, since manually operable welding apparatus comprising one or more hand held electrodes have frequently been utilized for performing various precision welding operations in the manufacture of certain electrical components as well as in the manufacture of various jewelry items, arcing has represented a significant manufacturing problem in both the electronics industry and the jewelry industry.

The instant invention provides an effective solution to the problem of arcing during resistance welding. Specifically, the instant invention provides a welding apparatus which is operative for sensing the contact resistances between a pair of electrodes and a workpiece assembly, and for controlling the application of power to the workpiece assembly so that a welding operation can only be carried out when the contact resistances are below a predetermined threshold level. Hence, the apparatus of the instant invention is adapted so that a welding operation can only be carried out when the contact resistances between the electrodes thereof and a workpiece assembly are at levels which are unlikely to cause arcing. Still more specifically, the welding apparatus of the instant invention comprises first and second electrodes which are engageable with a workpiece assembly, power means which is operable for supplying a sufficient level of voltage potential across the electrodes and for passing a sufficient electrical current between the electrodes to carry out a welding operation, and resistance sensing means for sensing the resistance in the electrical circuit path between the electrodes. The welding apparatus further comprises the control means for comparing the sensed resistance in the electrical circuit path between electrodes with a predetermined threshold resistance value and for reducing the amount of power supplied to the electrodes through the power means in the event that the sensed resistance is above the threshold resistance value. The control means is preferably operable for reducing the amount of power supplied to the first and second electrodes by reducing the amount of current supplied to the electrodes, and the first electrode preferably comprises an electrode plate which is adapted for receiving a workpiece assembly thereon, whereas the second electrode preferably comprises a manually manipulatable electrode probe which is positionable in engagement with a workpiece assembly at a specific location thereon for performing a welding operation on the workpiece assembly. The apparatus preferably further includes current sensing means for sensing the magnitude of the current passing between the first and second electrodes and current control means for controlling the power means to maintain the magnitude of the current passing between the first and second electrodes at a predetermined level. The power means is preferably operable for passing a predetermined pattern of current pulses between the first and second electrodes and the current control means is preferably operative for maintaining the magnitude of the current pulses at a predetermined control level. Further, the probe is preferably constructed of a material having a sufficiently high resistance to cause the portion of the probe contacting a workpiece assembly during the welding operation to be heated to a temperature above the melting point of the material in the workpiece assembly contacted by the probe.

It has been found that the apparatus of the instant invention can be effectively utilized for carrying out a precision welding operation without arcing. In this regard, it has been found that because the apparatus of the instant invention is operative for sensing the contact resistances between the electrodes and a workpiece assembly and for energizing the electrodes to carry out a welding operation only in the event that the contact resistances are below a predetermined arcing threshold value, the apparatus can be effectively utilized for carrying out welding operations without arcing. In addition, because the apparatus of the instant invention is operative for precisely controlling the magnitude of the current passing between the electrodes thereof during a welding operation, the apparatus can be more effectively utilized for precisely and accurately applying the correct amount of power to a workpiece assembly to effect a welding operation thereon. Still further, because the apparatus of the instant invention preferably includes a relatively high resistance probe which is adapted so that it is heated to a temperature above the melting point of the metal in a workpiece assembly during a welding operation the probe of the apparatus of the instant invention is adapted to enhance a welding operation by increasing the amount of heat supplied to a workpiece assembly.

Accordingly, it is a primary object of the instant invention to provide a welding apparatus which is operable for carrying out a resistance welding operation without arcing.

Another object of the instant invention is to provide an effective resistance welding apparatus comprising a manually manipulatable electrode probe which is operative for carrying out a welding operation without arcing.

An even further object of the instant invention is to provide an effective welding apparatus for carrying out a resistance welding operation by passing a precisely controlled current level between a pair of welding electrodes.

An even still further object of the instant invention is to provide an apparatus for carrying out a resistance welding operation utilizing a high resistance electrode.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
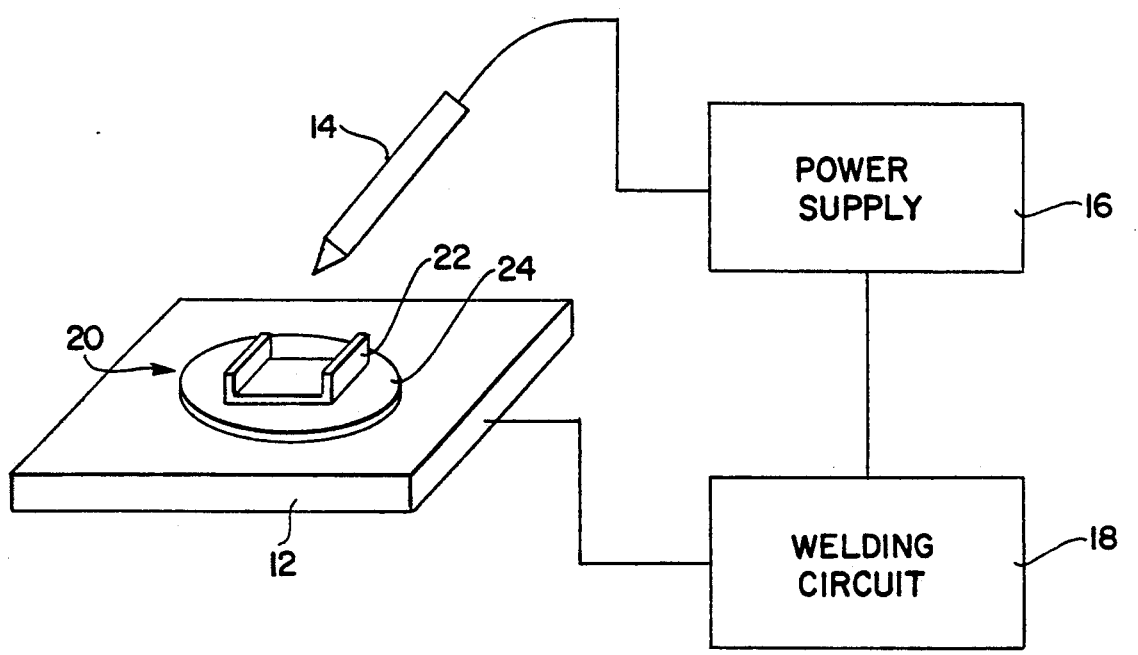
FIG. 1 is a schematic perspective view of the apparatus of the instant invention.

Referring now to the drawings, the welding apparatus of the instant invention is illustrated and generally indicated at 10 in FIG. 1. The welding apparatus 10 comprises first and second electrodes 12 and 14, respectively, and a power supply 16 which form a part of power supply circuit 17, and a welding circuit generally indicated at 18 which is operative for controlling the power supply circuit 17. The first electrode 12 as herein embodied comprises an electrode plate which is adapted for receiving a workpiece assembly generally indicated at 20 thereon, and the second electrode 14 comprises an electrode probe which is operative for contacting the workpiece assembly 20 in order to weld a first workpiece element 22 thereof to a second workpiece element 24 thereof. The welding circuit 18 is operative for sensing the resistance in the electrical circuit path between the contact plate 12 and the probe 14 when the probe 14 is in contact with the workpiece assembly 20 in order to determine whether or not the electrode probe 14 is in sufficiently pressurized engagement with the workpiece assembly 20 to carry out a welding operation without arcing. The welding circuit 18 is further operative for applying a voltage potential across the electrodes 12 and 14, and for passing an electrical current therebetween sufficient to perform a welding operation when the electrical resistance in the circuit path between the electrodes 12 and 14 is at a level which is unlikely to cause arcing between the probe 14 and the workpiece assembly 20. In any event, it should be noted that, although the workpiece assembly 20 as herein illustrated and described comprises the first and second workpiece elements 22 and 24, respectively, it will be understood that the apparatus 10 can alternatively be utilized for performing welding or even soldering operations on other workpiece assemblies comprising more than two elements or further comprising welding compositions or materials.

The first electrode or electrode plate 12, as herein embodied, comprises a copper plate having a thickness of approximately one-eighth of an inch and it is electrically connected to the welding circuit 18 through a high capacity conductor cable. The electrode plate 12 is adapted for receiving the workpiece assembly 20 thereon so that the second workpiece element 24 is in intimate electrical contact with the upper surface of the plate 12.

The second electrode or probe 14 preferably comprises a high resistance probe made from a relatively high resistance material, such as copper impregnated graphite, so that the probe 14 has a substantially higher resistance than the electrode plate 12. Probes of this type are generally marketed for electro-discharge machining operations and are readily available through commercial channels.

The power supply 16 preferably comprises a conventional DC power supply and it is operative for supplying a relatively high amperage DC electrical current at a predetermined voltage level, such as 6 volts. In this regard, when utilizing a 6 volt power supply the power supply 16 is preferably operable for supplying current at levels of up to approximately 1000 amperes, depending on the particular application. However, it will be understood that the use of other higher voltage power supplies which are capable of delivering current at levels of up to 100,000 amperes are contemplated. Further, while the power supply 16 preferably comprises a DC power supply, it will be understood that other embodiments of the welding apparatus of the instant invention which use AC current are contemplated and hence, it will be understood that the power supply 16 could alternatively be embodied as an AC power supply.

Figure 2:
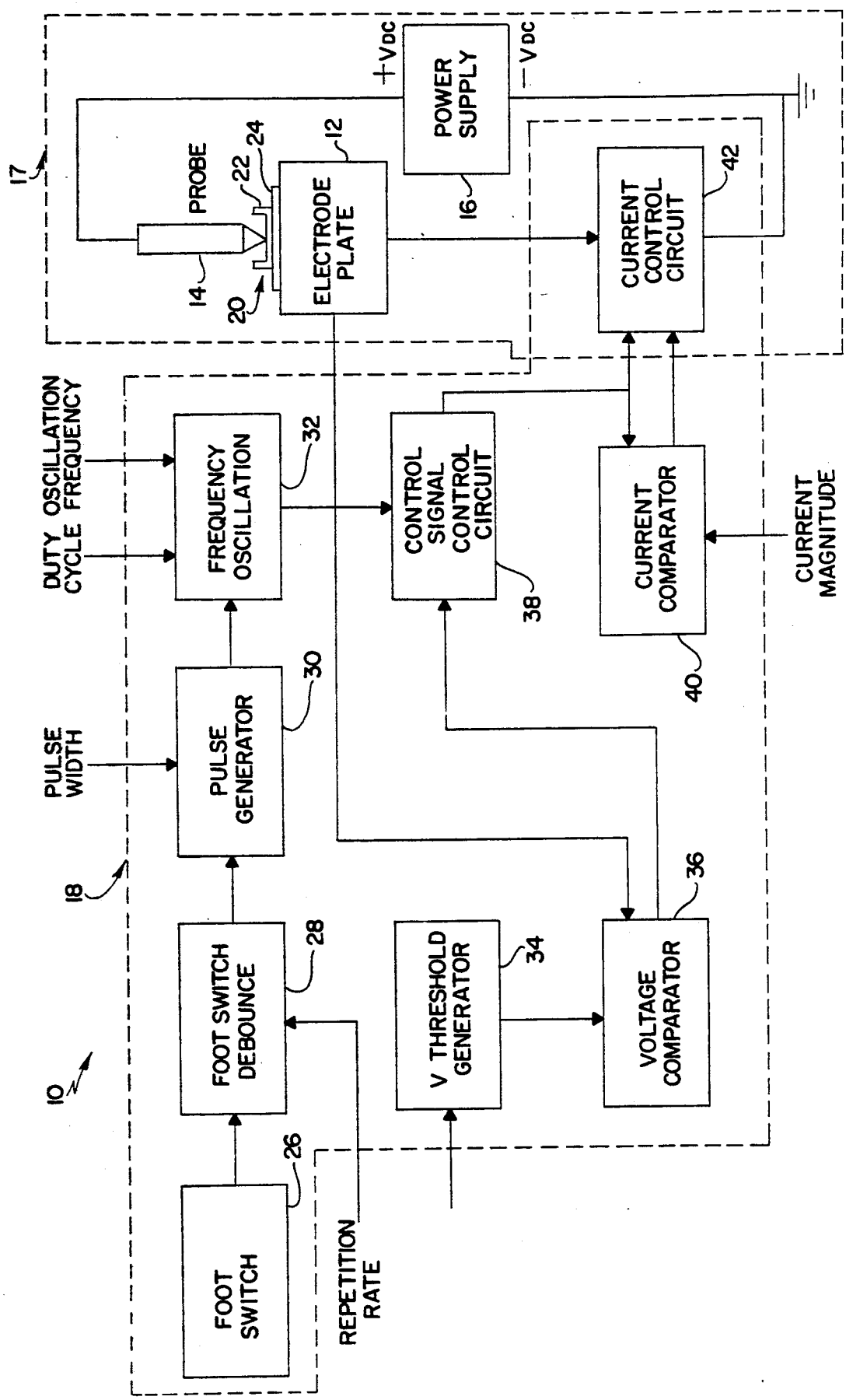
FIG. 2 is a block diagram of the welding circuit thereof.

The welding circuit 18 is illustrated most clearly in FIG. 2 and it comprises a foot switch 26, a foot switch debounce circuit 28, a pulse generator 30, a frequency oscillator 32, a threshold voltage generator 34, and a voltage comparator 36. The welding circuit 18 further comprises a control signal control circuit 38, a current comparator circuit 40 and a current control circuit 42.

During operation of the welding circuit 18, the foot switch 26, the foot switch debounce circuit 28, the pulse generator 30, and the frequency oscillator 32 are actuatable for generating a series of voltage pulses, and the threshold voltage generator 34 and the voltage comparator 36 are operative for sensing the resistance in the circuit between the probe 14 and the electrode plate 12. The control signal control circuit 38 is responsive to the voltage comparator 36 for passing the pulses from the frequency oscillator 32 to the current control circuit 42 only in the event that the resistance in the circuit between the probe 14 and the electrode plate 12 is below a predetermined threshold value. The current control circuit 42 is responsive to the voltage pulses from the control signal control circuit 38 for passing current through the circuit between the probe 14 and the electrode plate 12 with the power supply 16, and the magnitude of the current supplied to the power supply circuit 17 between the probe 14 and the plate 12 with the power supply 16.

The foot switch 26 comprises a conventional foot switch which is manually depressible for generating an electrical voltage signal. Foot switches of this type are well known and commonly used in conventional manual welding apparatus.

The foot switch debounce circuit 28 comprises a conventional debounce and pulse shaper circuit and it is operative for eliminating noise in the signal from the foot switch 26 as the foot switch 26 is opened or closed. The debounce circuit 28 preferably comprises a conventional debounce circuit comprising an industry standard device, such as a Motorola MC1455 which is configured as a debounce and pulse shaper. The debounce circuit 28 is further operative for converting a continuous pulse which is produced when the foot switch is depressed into a series of spaced, relatively short, shaped pulses which are produced at predetermined intervals. Alternatively, the debounce circuit 28 can be configured to produce only a single pulse each time the foot switch 26 is depressed. The foot switch debounce circuit 28 preferably includes a rheostat for adjusting the repetition rate of the pulses produced from the debounce circuit 28.

The pulse generator circuit 30 is responsive to the signals from the foot switch debounce circuit 28 for generating pulse signals having durations which correspond to the desired durations of the power pulses passed to the electrodes 12 and 14 from the power supply 16. The pulse generator preferably comprises a timer circuit, such as an generator preferably comprises a timer circuit, such as an MC1455, although alternatively the pulse generator could comprise a microprocessor for generating pulses. The pulse generator preferably further comprises a rheostat for adjusting the width of the generated pulses.

The frequency oscillator 32 is responsive to the pulses from the pulse generator circuit 30 for producing a series of short higher frequency pulses during each of the pulses from the pulse generator circuit 30. The frequency oscillator is of conventional configuration and it preferably comprises an oscillator chip, such as a Motorola MC34060AP, although the frequency oscillator could alternatively be implemented with a conventional microprocessor circuit. The frequency oscillator 32 further comprises a transistor such as a 2N2222 transistor for turning the frequency oscillations on and off. The frequency oscillator circuit preferably further includes a pair of rheostats for adjusting the duty cycle (duration) and frequency of the pulses from the frequency oscillator 32.

The threshold voltage generator 34 is of conventional configuration and it is operative for generating a threshold voltage signal. The threshold voltage generator 34 preferably comprises conventional circuit including a bypass capacitor, a voltage reference, such as a Motorola TL431,A and a potentiometer which is adjustable for varying the threshold voltage from the threshold voltage generator 34.

Figure 3:
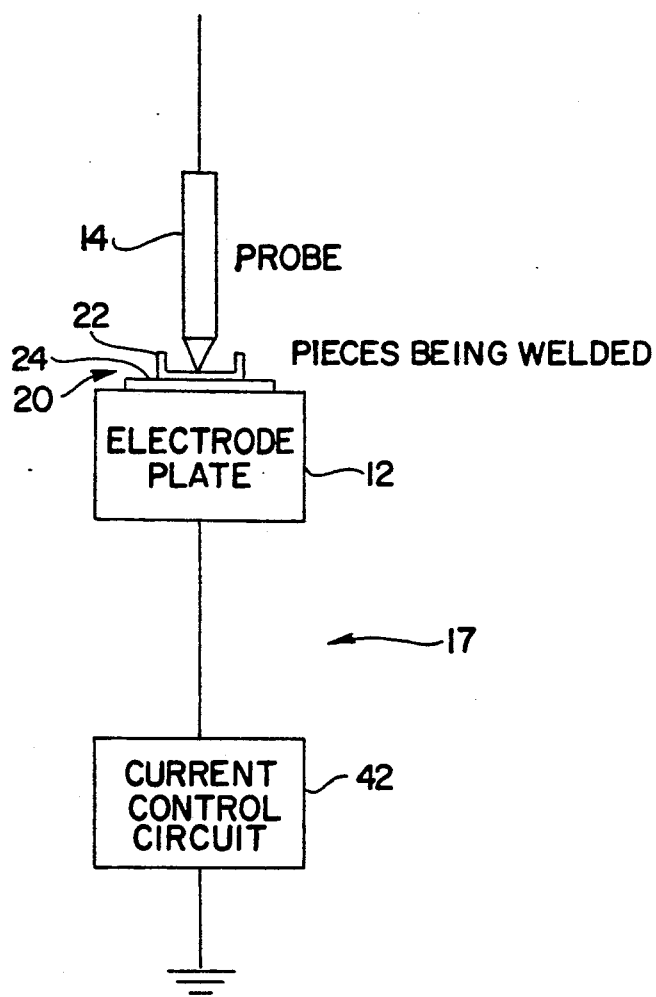
FIG. 3 is a schematic view of the electrodes and current control circuit thereof.
Figure 4:
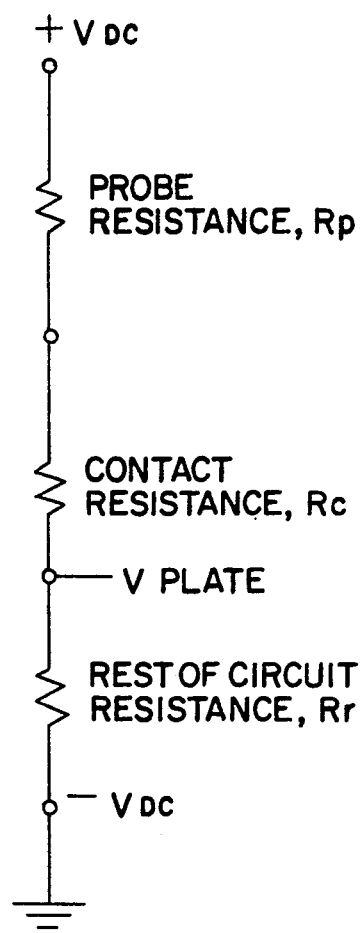
FIG. 4 is an electrical schematic view of the electrodes and the control circuit.

The voltage comparator 36 is operative for comparing the voltage from the threshold voltage generator 34 with the voltage at the plate 12 in order to determine whether or not the contact resistance in the circuit between the probe 14 and the plate 12 is above or below a predetermined threshold value. In this regard, referring to FIGS. 3 and 4, it will be seen that the voltage drop through the power supply circuit comprising the probe 14, the workpiece assembly 20, the plate 12, and the current control circuit 42, is directly related to a resistance value $R_p$ representing the resistance of the probe 14, a resistance value $R_c$ representing the contact resistance (consisting of the sum of the contact resistance between the probe 14 and the workpiece assembly 20, the resistance of the current path through the workpiece assembly 20 and the contact resistance between the workpiece assembly 20 and the electrode plate 12), and a resistance value $R_r$ representing the resistance of the remainder of the power supply circuit 17. Since $R_p$ and $R_r$ are effectively constant, the only variable resistance in the power supply circuit is the contact resistance $R_c$. As a result, the voltage at the plate 12, Vplate is dependent on the current passed through the power supply circuit 17 and the contact resistance $R_c$. However, since the overall voltage $V_{total}$ across the power supply circuit 17 is determined by the power supply 16, the current passed through the power supply circuit 17 is dependent on the resistances $R_p$, $R_c$, and $R_r$. Consequently, it can be determined that: $V_{plate} = V_{total} \times R_r (R_p + R_c + R_r)$. Further, since the workpiece assembly 20 is normally placed in intimate contact with the electrode plate 12 and since the resistance of the circuit path through the workpiece assembly 20 is normally a constant value normally the only variable in the contact resistance $R_c$ is the actual contact resistance between the probe 14 and the workpiece assembly 20. As a result, by monitoring the voltage level $V_{plate}$ at the plate 12 it is possible to determine whether or not the contact resistance $R_c$ is within a range which would indicate that a welding operation can be performed without causing arcing between the probe 14 and the workpiece assembly 20. In this regard, the voltage comparator circuit 36 is operative for comparing $V_{plate}$, the voltage at the plate 12, with the threshold voltage from the threshold voltage generator 34 in order to determine whether or not a welding operation can be performed without arcing. The voltage comparator circuit 36 preferably comprises a comparator integrated circuit, such as a National Semiconductor LM393, and it is operative for producing a resultant voltage signal which is sent to the control signal control circuit 38 for controlling the operation of the current control circuit 42.

The control signal control circuit 38 is operative for receiving pulse signals from the frequency oscillator 32 and voltage control signals from the voltage comparator circuit 36 and for passing the signals from the frequency oscillator 32 to the current control circuit 42 only in the event that the voltage at the plate 12 $V_{plate}$ is above the predetermined threshold value determined by the threshold voltage generator 34. In other words, the control signal control circuit 38 is operative for passing the signal from the frequency oscillator circuit 32 to the current control circuit 42 only in the event that the contact resistance $R_c$ is below the threshold value determined by the threshold voltage generator 34. The control signal control circuit preferably comprises a timer circuit such as an MC1455 which is connected in a debounce configuration. The output from the voltage comparator circuit 36 is operative for triggering the debounce circuit in the control signal control circuit 38 and the output from the voltage comparator circuit 36 is logically combined or "ANDed" with the output of the debounce circuit in the control signal control circuit 38. The resultant signal is then logically combined or "ANDed" with the output of the frequency oscillator circuit 32, and the resultant signal is sent to the current control circuit 42. This logic operation is preferably implemented by means of an MC140903B, which contains several NAND gates.

The current comparator circuit 40 is operative for comparing the current level passing through the current control circuit 42 utilizing a current shunt and for generating a current adjust signal which is sent to the current control circuit 42 for maintaining the current level in the power supply circuit at a predetermined set point value. The current comparator circuit 40 preferably comprises two LM346 operational amplifiers which are configured as different amplifiers. The current comparator circuit 40 preferably further includes a potentiometer and a voltage reference, such as a Motorola TL431,A, which are operative for adjusting the magnitude of the set point current passing through the power supply circuit. The current comparator circuit 40 is only operative for controlling the current level in the power supply circuit when the contact resistance $R_c$ is below the predetermined threshold value thereof and the control signal from the control signal control circuit 38 is active.

The current control circuit 42 which is included in both the welding circuit 18 and the power supply circuit 17 preferably comprises an NPN transistor, such as a 2N2222 transistor and a plurality of FETs. The NPN transistor in the current control circuit 42 is operative for receiving and combining signals from the current comparator 40 and the control signal control circuit 38 and for emitting a gate signal for the FETs which controls the duration and amplitude of the current signals in the power supply circuit 17. The current control circuit 42 preferably comprises a plurality of FETs which are connected in parallel, the exact number of FETs depending on the current requirements for the particular welding application. In any event, the amplitude and duration of the current pulses passing through the power supply circuit 17 are determined by the pulse generator 30, the frequency oscillator 32 and the current comparator 40, and they are controlled by the control signal control circuit 38.

Figure 5:
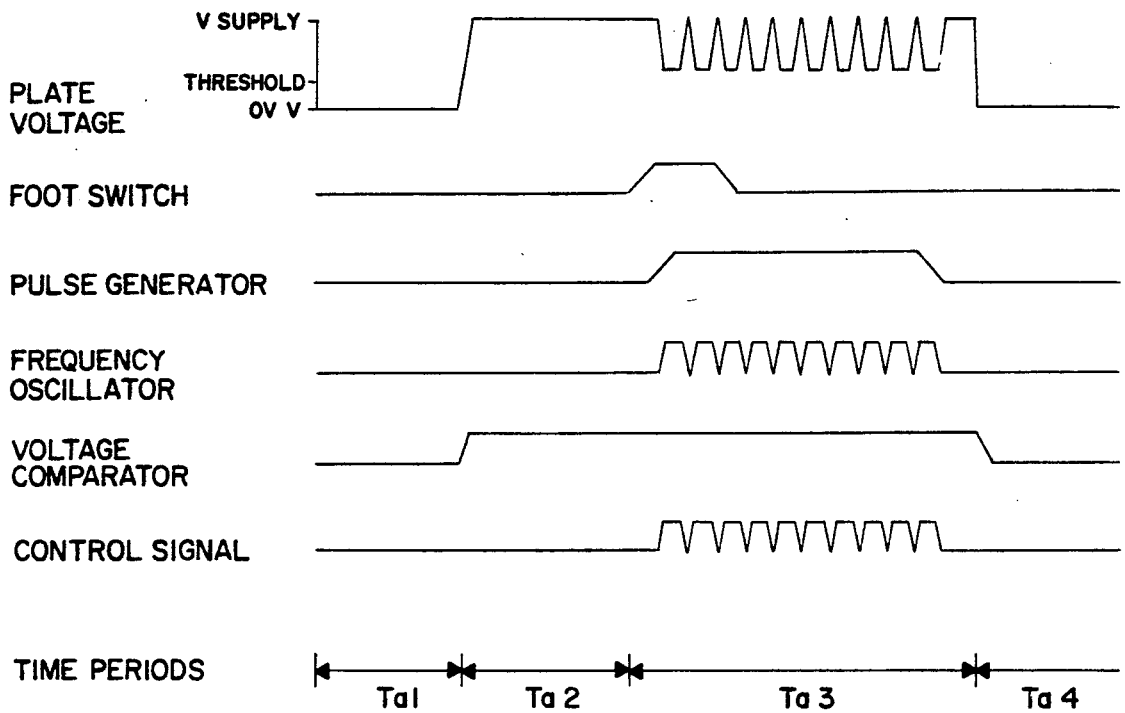
FIGS. 5 and 6 are timing diagrams illustrating the operation of the welding circuit.

Referring now to FIG. 5, the operation of the welding circuit 18 is shown during a welding operation wherein the contact resistance $R_c$ is below the threshold value so that a welding operation can be carried out as illustrated. During time interval Ta1 the probe 14 is spaced from the workpiece assembly 20 so that no current passes through the power supply circuit 19. However, at the beginning of time interval Ta2 the probe is contacted with the workpiece assembly 20 to effect a welding operation. As soon as the probe 14 is contacted with the workpiece assembly 20 the plate voltage $V_{plate}$ rises to a maximum level and the voltage comparator 36 determines that the plate voltage $V_{plate}$ is at a high level. Therefore, the voltage comparator 34 produces a signal which enables the control signal control circuit 38 to pass the signals from the frequency oscillator 32 to the current control circuit 42. Accordingly, when the foot switch 26 is depressed at the beginning of time interval Ta3 a welding operation can be carried out on the workpiece assembly 20. In this regard, as the foot switch 26 is depressed a pulse signal is generated from the foot switch 26 which is passed to the foot switch debounce 28 and on to the pulse generator 30. The pulse generator 30 then produces a signal which determines the duration of the power pulse cycle to be applied to the welding operation. In response thereto the frequency oscillator 32 produces an oscillating signal having a duration which is determined by the pulse generator and this signal is passed on to the control signal control circuit 38. As current begins to pass through the power supply circuit 17 the voltage level at the plate 12 $V_{plate}$ remains above the threshold value as long as the contact resistance $R_c$ is within an acceptable level. Since the voltage level at the plate 12 is above the threshold value the control signal control circuit 38 emits a control signal corresponding to the signals from the frequency oscillator 32 and this control signal is passed to the current control circuit 42 causing a welding operation to be carried out during time interval Ta3. Thereafter, during time interval Ta4 the probe 14 is removed from the workpiece assembly 20. Alternatively, the foot switch 26 could be operative with a repetitive pulse at predetermined time intervals so that the welding operation carried out during Ta3 could be repeated during Ta4 until the desired welding operation has been completed.

Figure 6:
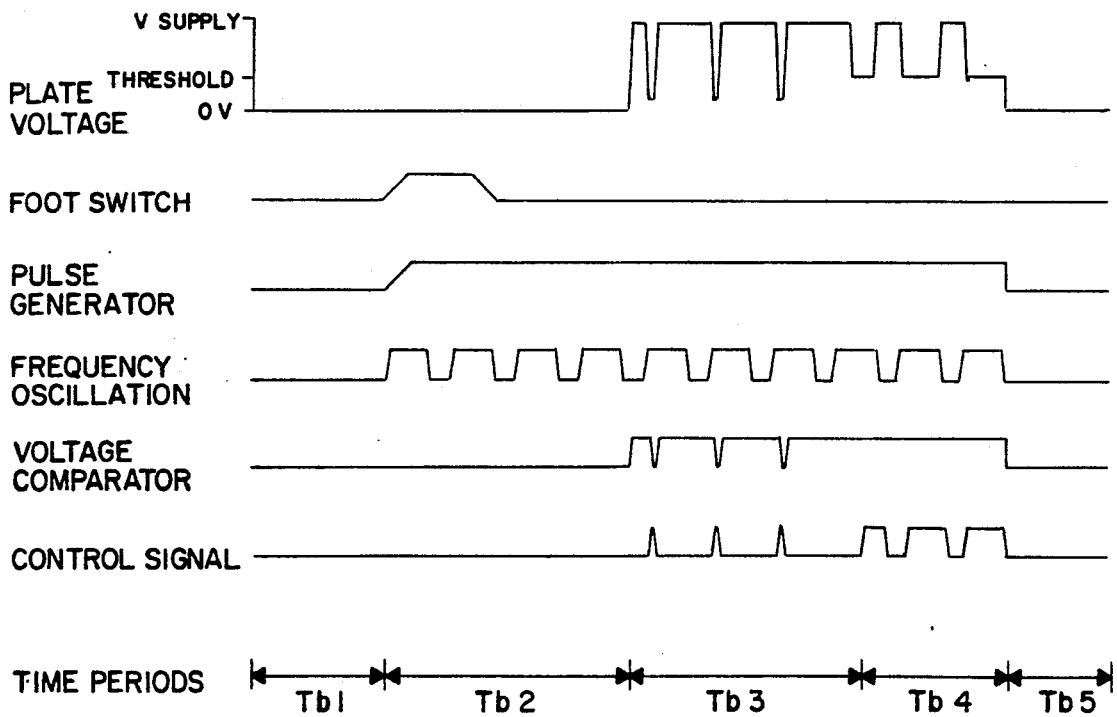

Referring now to FIG. 6, a welding operation is illustrated wherein the contact resistance $R_c$ is above the threshold value thereof. As will be seen, during time interval Tb1 the probe 14 is maintained in spaced relation from the workpiece assembly 20. At the beginning of time interval Tb2 the foot pedal is depressed while the probe 14 is still spaced from the workpiece assembly 20. This causes a triggering pulse to be initiated from the foot switch at 26 and the foot switch debounce circuit 28. As a result, the pulse generator 30 and the frequency oscillator 32 are actuated for producing signals similar to those hereinabove set forth. However, because the voltage level $V_{plate}$ at the plate 12 is below the threshold voltage level as long as the probe 14 is spaced from the workpiece assembly 20, the signal from the voltage comparator 36 remains at a zero level. When the probe 14 is then lightly contacted with the workpiece assembly 20 at the beginning of time interval Tb3, the plate voltage level $V_{plate}$ increases to the supply level $V+_{DC}$ ($V_{total}$) and the voltage comparator 36 produces a positive signal which allows the control signal control circuit 38 to pass a high level control signal to the current control circuit 42. As will be noted, this is because in the example illustrated in FIG. 6 the signal from the frequency oscillator 32 is coincidentally at a low value when the probe 14 is contacted with the workpiece assembly 20 so that a very low current is passed through the power supply circuit 17. However, when the signal from the frequency oscillator 32 increases to a high value, high current is passed through the power supply circuit 17, and therefore the contact resistance between the probe 14 and the workpiece assembly 20 causes the plate voltage $V_{plate}$ to be reduced to a point below the threshold voltage level. As a result, the signal from the voltage comparator is also reduced to a low value so that the value of the control signal from the control signal control circuit 38 is reduced to a zero value. Further, because the control signal control circuit 38 includes a debounce circuit, the control signal therefrom remains at a zero value for a predetermined sample time interval. As a result, during this interval the plate voltage increases to the supply level causing the signal from the voltage comparator to also go to a high level. At the end of the sample time interval for the debounce circuit in the control signal control circuit 38, the control signal control circuit 38 again detects a positive signal from the voltage comparator 36 so that current can again pass through the power supply circuit 17. However, as current is passed through the power supply circuit 17 the contact resistance between the probe 14 and the workpiece assembly 20 causes the plate voltage $V_{plate}$ and the signal from the voltage comparator circuit 36 to again drop as long as the contact resistance $R_c$ is above the threshold level. As will be noted in the example illustrated in FIG. 6, the control signal from the control signal control circuit 38 causes the welder circuit 18 to sample, or test, the plate voltage $V_{plate}$ under high current conditions three times during time interval Tb3. At the beginning of time interval Tb4, the probe 14 is finally placed in firm contact with the workpiece assembly 20 so that the contact resistance between the probe 14 and the workpiece assembly 20 is below the threshold resistance value. As a result, the plate voltage remains at or above the threshold level throughout time interval Tb4 so that the signal from the voltage comparator 36 remains high and the control signal from the control signal control circuit 38 causes a series of current pulses to be passed through the power supply circuit 17.

EXAMPLE

In a specific application of the instant invention a welding apparatus comprising an electrode plate 12 made of one-eighth inch thick copper plate and an electrode probe made from copper impregnated graphite was utilized to weld a nickel silver jewelry pin back onto a cast white metal jewelry brooch. The brooch was placed face down on the electrode plate 12 and the pin back was placed on the rear side of the brooch so that it faced upwardly. A small amount of flux was placed between the pin back and the brooch. The welding operation was carried out utilizing a 6 volt DC power supply and the pulse width of the pulse generator 30 was set at 250 ms. The frequency oscillator 32 was set to oscillate at a frequency of approximately 40 Hz with a duty cycle of approximately 80% on and 20% off. The foot switch debounce 28 was set at a zero repetition rate so that each time the foot switch 26 was depressed a single pulse was generated from the foot switch debounce circuit 28. The threshold voltage of the voltage threshold generator 34 was set to a level of approximately 0.10 volts and the current magnitude of the current comparator 40 was set to a level of approximately 250 amperes. The probe 14 was then placed in contact with the pin back and the foot pedal 26 was depressed. It was found that even though the probe 14 was initially placed in only light contact with the pin back no arcing occurred, although the pin back could not be welded to the brooch with probe 14 in only light contact with the pin back. When the probe 14 was finally placed in firm, pressurized engagement with the pin back and the foot pedal 26 was again depressed the circuit 18 operated to control the power supply circuit 17 to pass high level current pulses through the power supply circuit 17 and to thereby weld the pin back to the brooch. Further, it was found that this operation was carried out virtually free of arcing and that when the probe 14 was then removed from the pin back neither the pin back nor the brooch showed any damage or distortion from the welding operation. It was further found that the pin back was firmly and positively welded to the brooch. Consequently it was concluded that the circuit 18 had effectively controlled the flow of current through the welding circuit 17 in order to avoid arcing during the welding operation.

It is seen therefore that the instant invention provides an effective welding apparatus for performing welding operations without significant arcing. The voltage comparator circuit 36 is operative for sensing the voltage level at the plate 12, and for comparing the sensed voltage level with a predetermined voltage threshold in order to determine whether or not the resistance between the probe 14 and a workpiece assembly, such as the workpiece assembly 20, is below a predetermined threshold level. In the event that the contact resistance between a probe 14 and the workpiece assembly 20 is above the threshold level the control signal control circuit 38 is operative for reducing the current in the power supply circuit 17 to a minimal level until the contact resistance is reduced to an acceptable level. Once the probe 14 has been brought into firm, pressurized engagement with the workpiece assembly 20 so that the contact resistance is within an acceptable range the control signal control circuit 38 is operative for passing the frequency signals from the frequency oscillator 32 to the current control circuit 42 in order to activate the power supply circuit 19 to effect a welding operation with the probe 14. Further, during the course of a welding operation the current comparator 40 is operative for maintaining the current level at a predetermined set point value so that the current can be effectively controlled during the welding operation. Accordingly, the subject invention provides an effective welding apparatus which can be utilized for performing welding operations with a relatively high level of precision without damaging workpieces. Accordingly, it is seen that the subject invention represents a significant advancement in the art having substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:
1. A welding apparatus for carrying out a welding operation on a workpiece assembly comprising;
   a. first and second electrodes engageable with said workpiece assembly;
   b. power means operable for applying a sufficient voltage potential across said first and second electrodes and for passing a sufficient electrical current through an electrical circuit path extending there- between to carry out a welding operation on said workpiece assembly when said first and second electrodes are in engagement therewith, said electrical current being applied in a predetermined current pulse pattern consisting of a plurality of current pulses, said current pulses having amplitudes;

c. resistance sensing means for sensing the resistance in said electrical circuit path between said first and second electrodes; and d. control means for comparing the sensed resistance in said electrical circuit path between said first and second electrodes with a predetermined threshold resistance value and for reducing the amount of power supplied to said first and second electrodes through said power means by reducing the amplitudes of said current pulses in the event that the sensed resistance is above said threshold resistance value.

2. In the welding apparatus of claim 1, said first electrode comprising an electrode plate for receiving said workpiece assembly thereon, said second electrode comprising a manually manipulatable electrode probe manually positionable in engagement with said workpiece assembly for performing a welding operation thereon.

3. The welding apparatus of claim 1, further comprising current sensing means for sensing the magnitude of the current pulses passing between said first and second electrodes and current control means responsive to said current sensing means for controlling said power means to maintain the magnitude of the current pulses passing between said first and second electrodes at a predetermined control level whenever the magnitude of the current pulses passing between said first and second electrodes exceeds a predetermined minimum level.

4. A welding apparatus for carrying out a welding operation on a workpiece assembly, said apparatus comprising:

a. first and second electrodes;

b. power means operable for applying a sufficient voltage potential across said first and second electrodes and a sufficient electrical current through an electrical circuit path extending therebetween to carry out a welding operation on said workpiece assembly when said first and second electrodes are in engagement therewith, said electrical current being applied in a predetermined current pulse pattern consisting of a plurality of current pulses, said current pulses having amplitudes;

c. current sensing means for sensing the magnitude of the current passing through said circuit path between said first and second electrodes; and d. current control means responsive to said current sensing means for controlling said power means to maintain the magnitude of the current passing between said first and second electrodes at a predetermined control level by reducing the amplitude of said current pulses whenever the current passing between said first and second electrodes exceeds a predetermined minimum level.

5. A welding apparatus for carrying out a welding operation on a workpiece assembly comprising;

a. first and second electrodes engageable with said workpiece assembly;

b. power means operable for applying a sufficient voltage potential across said first and second electrodes and for passing a sufficient predetermined pattern of electrical current pulses therebetween to carry out a welding operation on said workpiece assembly when said first and second electrodes are in engagement therewith;

c. resistance sensing means for sensing the resistance in the electrical circuit path between said first and second electrodes;

d. control means for comparing the sensed resistance in the electrical circuit path between said first and second electrodes with a predetermined threshold resistance value and for reducing the amount of power supplied to said first and second electrodes through said power means in the event that the sensed resistance is above said threshold resistance value;

e. current sensing means for sensing the magnitude of the current pulses passing between said first and second electrodes; and f. current control means responsive to said current sensing means for controlling said power means to maintain the magnitude of the current pulses passing between said first and second electrodes at a predetermined control level whenever the magnitude of the current pulses passing between said first and second electrodes exceeds a predetermined minimum level.

6. In the welding apparatus of claim 5, said first electrode comprising an electrode plate for receiving said workpiece assembly thereon, said second electrode comprising a manually manipulatable electrode probe manually positionable in engagement with said workpiece assembly for performing a welding operation thereon.

7. A welding apparatus for carrying out a welding operation on a workpiece assembly comprising;

a. first and second electrodes engageable with said workpiece assembly;

b. power means operable for applying a sufficient voltage potential across said first and second electrodes and for passing a sufficient electrical current therebetween to carry out a welding operation on said workpiece assembly when said first and second electrodes are in engagement therewith;

c. resistance sensing means for sensing the resistance in an electrical circuit path extending through said power means and between said first and second electrodes; and d. control means for comparing the sensed resistance in said electrical circuit path with a predetermined threshold resistance value and for reducing the amount of power supplied to said first and second electrodes through said power means in the event that the sensed resistance is above said threshold resistance value.

8. In the welding apparatus of claim 7, said control means being operable for reducing the amount of power supplied to said first and second electrodes by reducing the amount of current supplied to said first and second electrodes.

9. The welding apparatus of claim 7, further comprising current sensing means for sensing the magnitude of the current passing between said first and second electrodes and current control means responsive to said current sensing means for controlling said power means to maintain the magnitude of the current passing between said first and second electrodes at a predetermined control level whenever the current passing between said first and second electrodes exceeds a predetermined minimum level.

10. In the welding apparatus of claim 9, said power means being operable for passing a predetermined pattern of current pulses between said first and second electrodes, said current control means maintaining the magnitude of said current pulses at said predetermined control level.

11. A welding apparatus for carrying out a welding operation on a workpiece assembly, said apparatus comprising:
   a. first and second electrodes;
   b. power means operable for applying a sufficient voltage potential across said first and second electrodes and a sufficient electrical current therebetween to carry out a welding operation on said workpiece assembly when said first and second electrodes are in engagement therewith;
   c. current sensing means for sensing the magnitude of the current passing through an electrical circuit path extending through said power means and between said first and second electrodes; and
   d. current control means responsive to said current sensing means for controlling said power means to maintain the magnitude of the current passing through said electrical circuit path at a predetermined control level whenever the current passing between said first and second electrodes exceeds a predetermined minimum level.

12. In the welding apparatus of claim 11, said power means being operable for passing a predetermined pattern of current pulses between said first and second electrodes, said current control means maintaining the magnitude of said current pulses at said predetermined control level.

* * * * *